April 30, 1940. R. W. GLASNER 2,198,767
SLIDE LOCKING MEANS FOR PRESSES AND THE LIKE
Filed Oct. 21, 1938 7 Sheets-Sheet 1
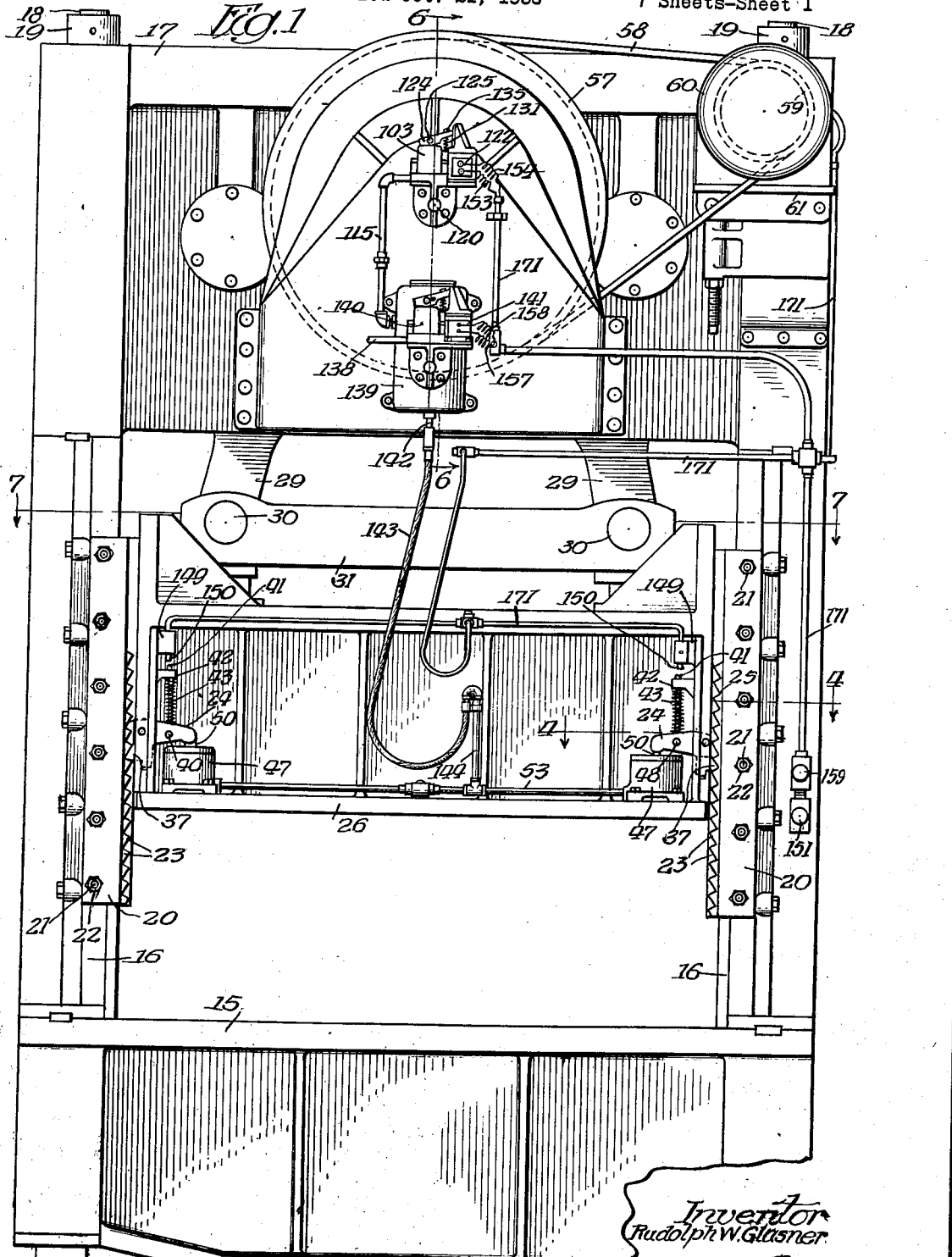
Inventor
Rudolph W. Glasner
By
Atty

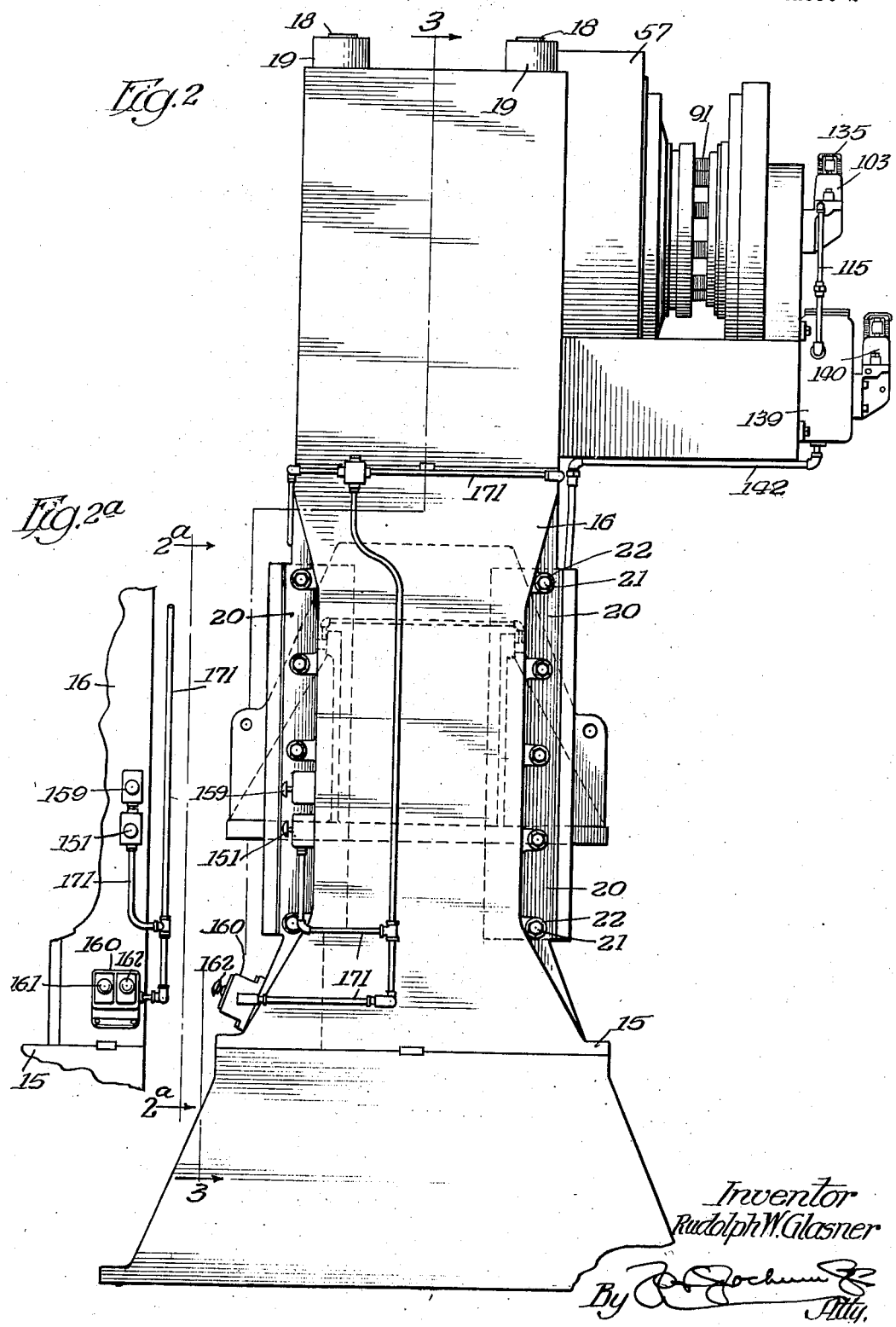

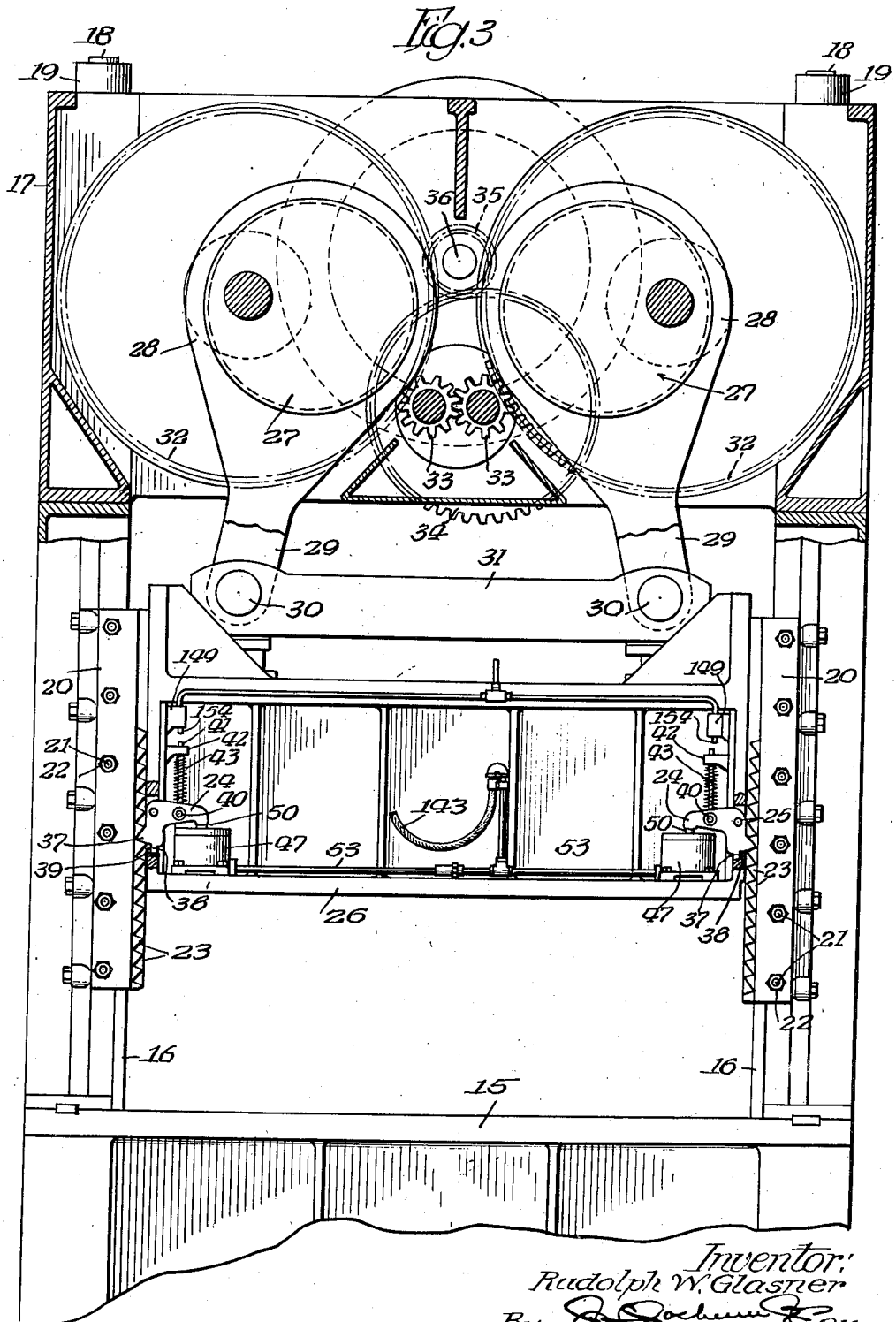

April 30, 1940. R. W. GLASNER 2,198,767
SLIDE LOCKING MEANS FOR PRESSES AND THE LIKE
Filed Oct. 21, 1938 7 Sheets-Sheet 4
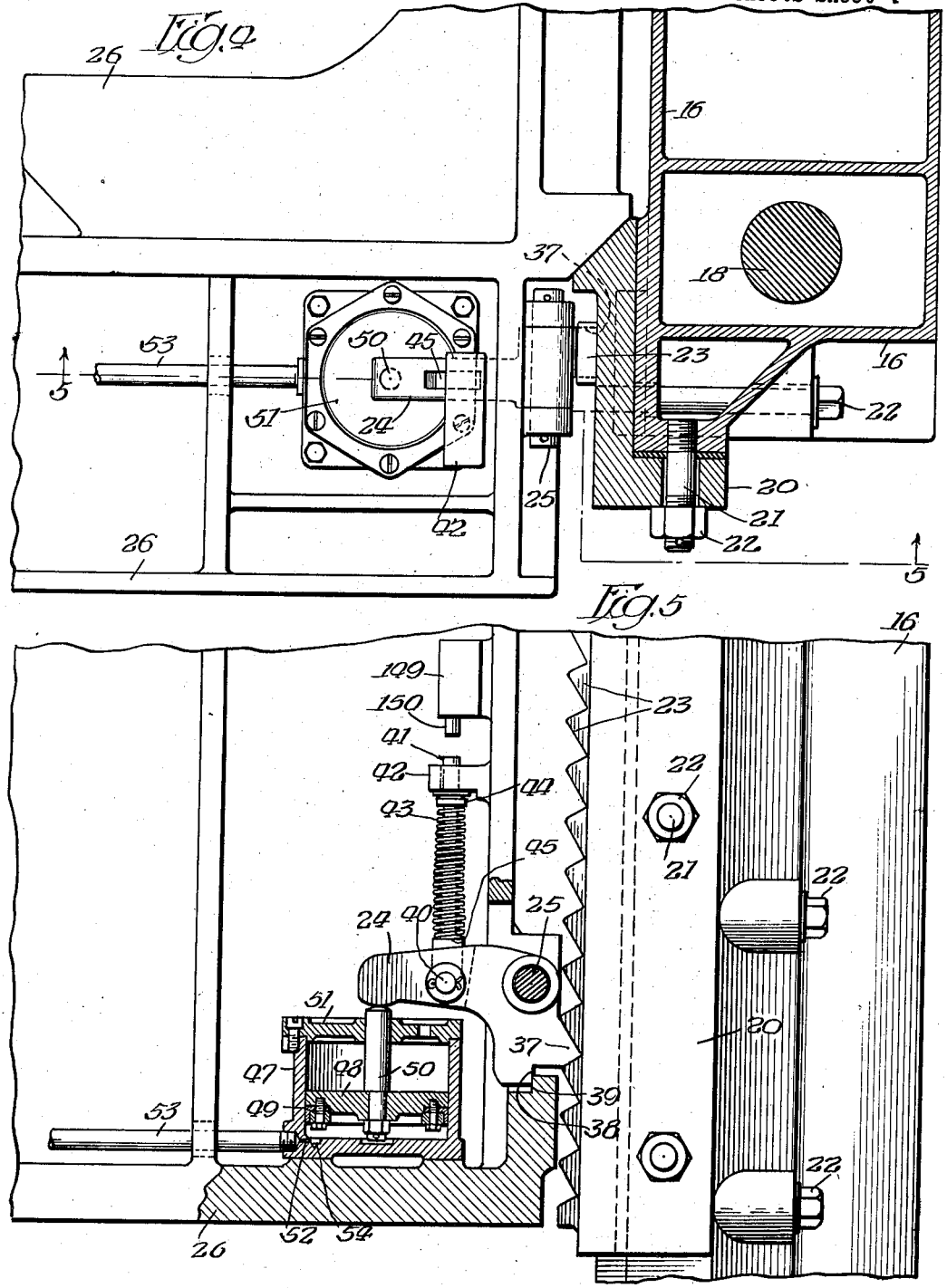
Inventor
Rudolph W. Glasner
By
Atty

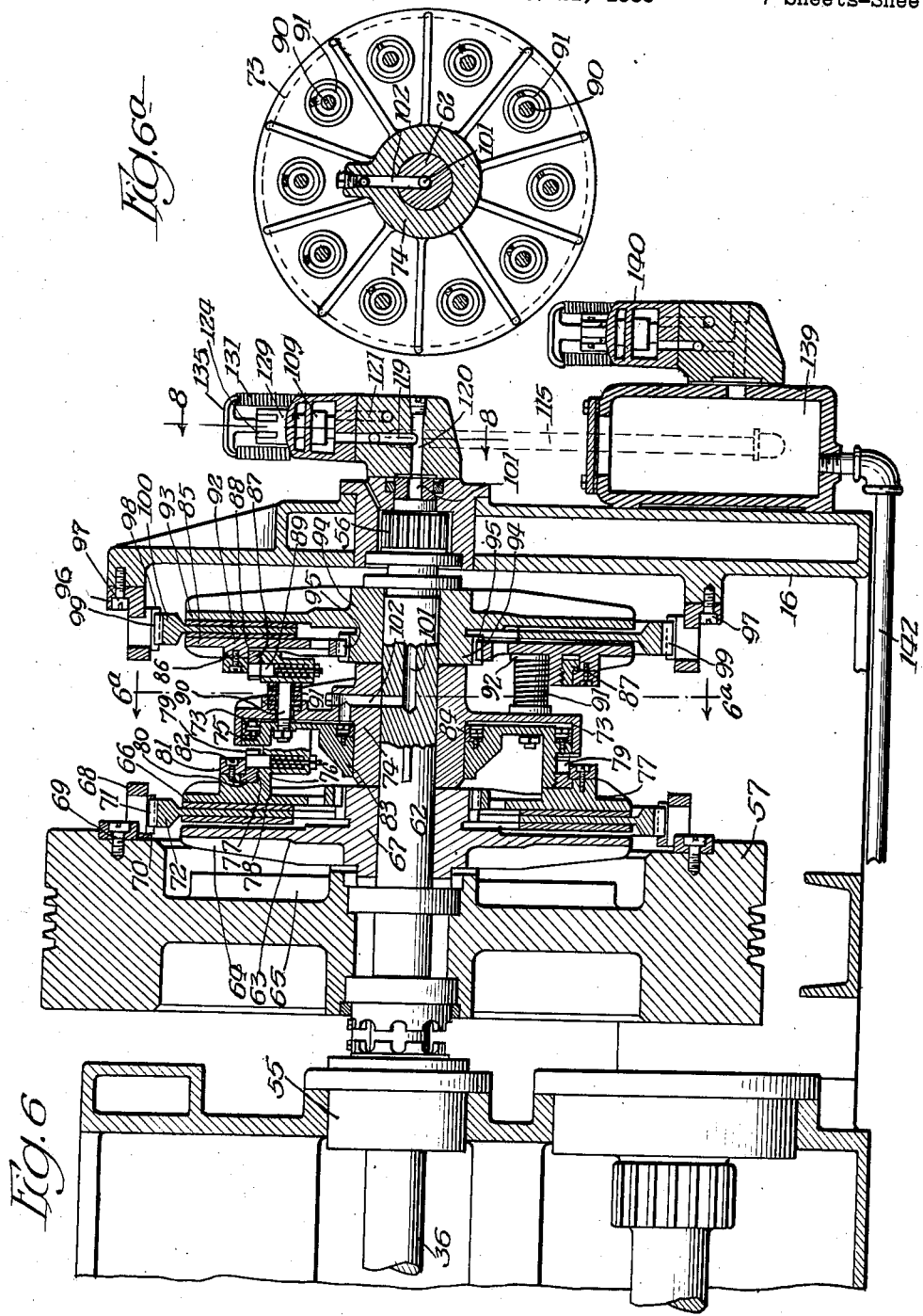

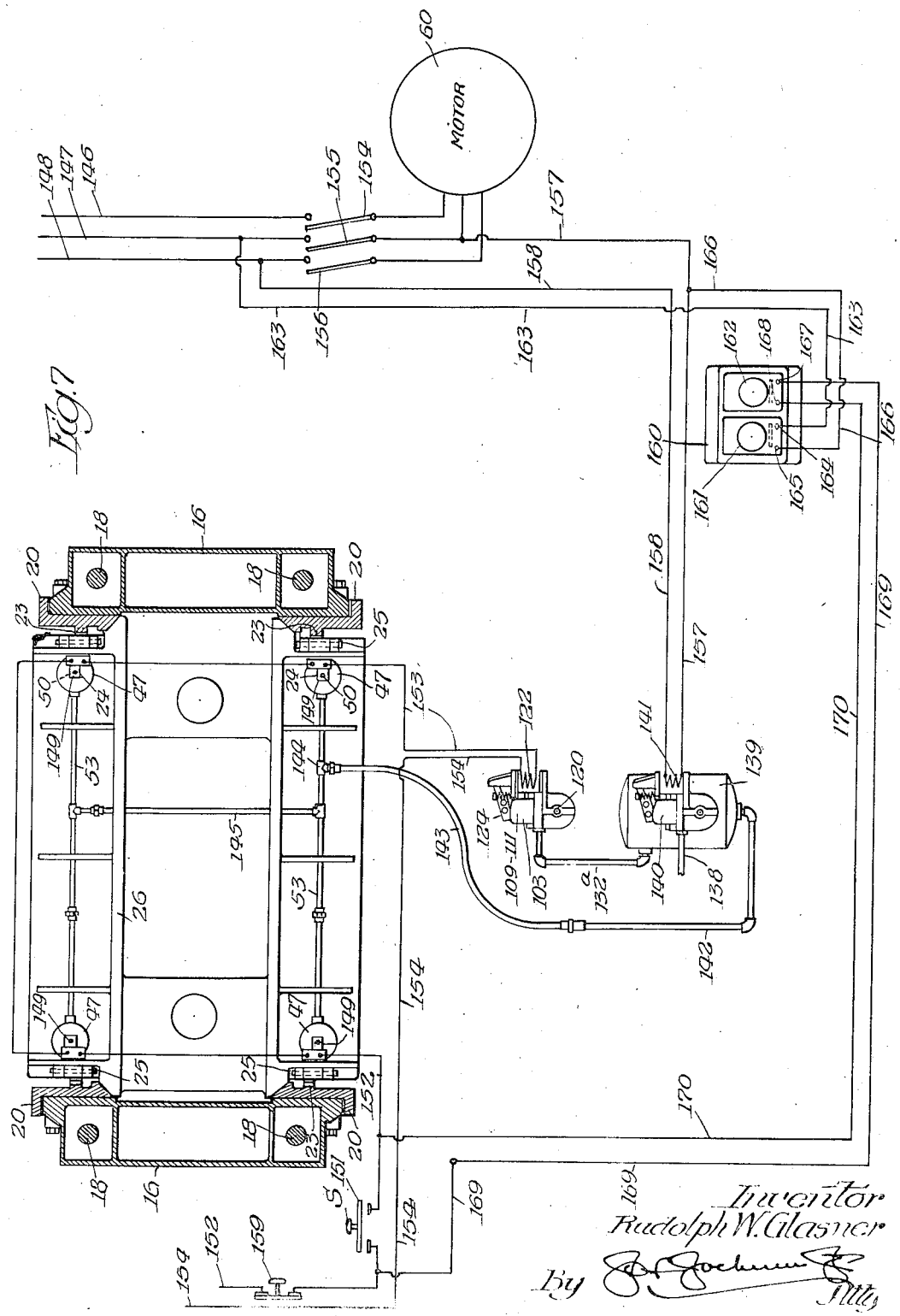

April 30, 1940.  R. W. GLASNER  2,198,767

SLIDE LOCKING MEANS FOR PRESSES AND THE LIKE

Filed Oct. 21, 1938  7 Sheets—Sheet 7

Inventor:
Rudolph W. Glasner
By [signature]
Atty.

Patented Apr. 30, 1940

2,198,767

UNITED STATES PATENT OFFICE 2,198,767

SLIDE LOCKING MEANS FOR PRESSES AND THE LIKE

Rudolph W. Glasner, Chicago, Ill.

Application October 21, 1938, Serial No. 236,239

14 Claims. (Cl. 192—144)

The present invention relates to safety mechanism for machines with reciprocating members, to prevent accidents to the operators who are often required to work in the path of movement of the reciprocating member.

It is the general practice to depend upon disengagement of a clutch or the setting of a brake, or both, to maintain or lock the reciprocating member against movement, which obviously is not sufficiently safe for the operator, as through vibrations or mechanical defects of the working members the locking of the movable member may not remain effective.

Often safety blocks are used which are of a length shorter than the distance from the top of the press bed to the bottom side of the slide, the movement of which slide the safety blocks are intended to prevent, with the result that by the time the slide contacts the end of the safety block, the slide has gained such momentum and force which the safety blocks cannot withstand.

Since safety blocks are often used in cases of emergency the correct wedging and securely fastening them between the bed and the slide is often neglected or rendered difficult, as the safety blocks are not always of equal length, or the ends of the blocks are not always square, which condition causes the blocks to have a tendency to slip out of place when the pressure of the slide is exerted upon the blocks.

This is particularly true when more than one block is used at the same time for safety, which is usually the case on presses of large size and tonnage. Many of these blocks are formed of timber, the objection being that it usually splits and the ends of the blocks do not remain square under constant use. Wooden blocks have been replaced with light metal blocks but this type of material reduces the strength of the safety blocks. Blocks designed of proper material and size become very heavy and cumbersome and difficult to handle by hand. Crane apparatus for handling such heavy blocks to place them in position under the slide present great difficulties in that final and hand adjustment with respect to the slide is necessary after being disconnected from the crane, as such heavy weights must be disconnected from the crane before the blocks can be properly placed in position with respect to the slide.

To provide means whereby such safety blocks may be dispensed with, and which means will safely lock the parts in place, and to provide automatic means for accomplishing their operation, are some of the objects of the present invention.

Another object is to provide suitable safety means for machines operated in connection with fly wheels and clutches, and to provide safety means for locking the reciprocating members while the fly wheel is still rotating.

In the present exemplification of this invention there is disclosed a power press, the reciprocating member or slide being, as usual, operated through the medium of a fly wheel and clutch, the power being transmitted by means of shafts and gearing.

The main driving shaft, by reason of its fast revolution and gearing exerts sufficient power for the total power required for reciprocating the parts of the machine, and the herein disclosed safety means have the added advantage of providing safety means which are constructed equal in their strength to the total power required and generated by the machines for its intended operations.

To render it unnecessary to provide means of a size and strength out of proportion with respect to the remaining parts of the machine and cumbersome, in the present construction it is possible to construct the safety means comparatively small and compact, yet possessing the necessary strength and rigidity to be equal in strength to sustain the weight of the slide and the dies attached thereto.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which:

Figure 1 is a front elevation of a press having safety mechanism constructed in accordance with the principles of this invention applied thereto.

Figure 2 is a right hand end elevation of Figure 1.

Figure 2ª is a view as taken on line 2ª—2ª, Figure 2.

Figure 3 is a detail view partly in vertical section and partly in section as taken on line 3—3 Figure 2, on an enlarged scale.

Figure 4 is a horizontal sectional view, on an enlarged scale, taken on line 4—4, Figure 1.

Figure 5 is a view partly in elevation and partly in section as taken on line 5—5 Figure 4.

Figure 6 is a detail sectional view, on an enlarged scale, as taken on line 6—6 Figure 1.

Figure 6a is a detail sectional view taken on line 6a—6a Figure 6.

Figure 7 is a diagrammatic view showing a portion of the press in section and also showing the wiring diagram for the control of the various parts.

Figure 8:
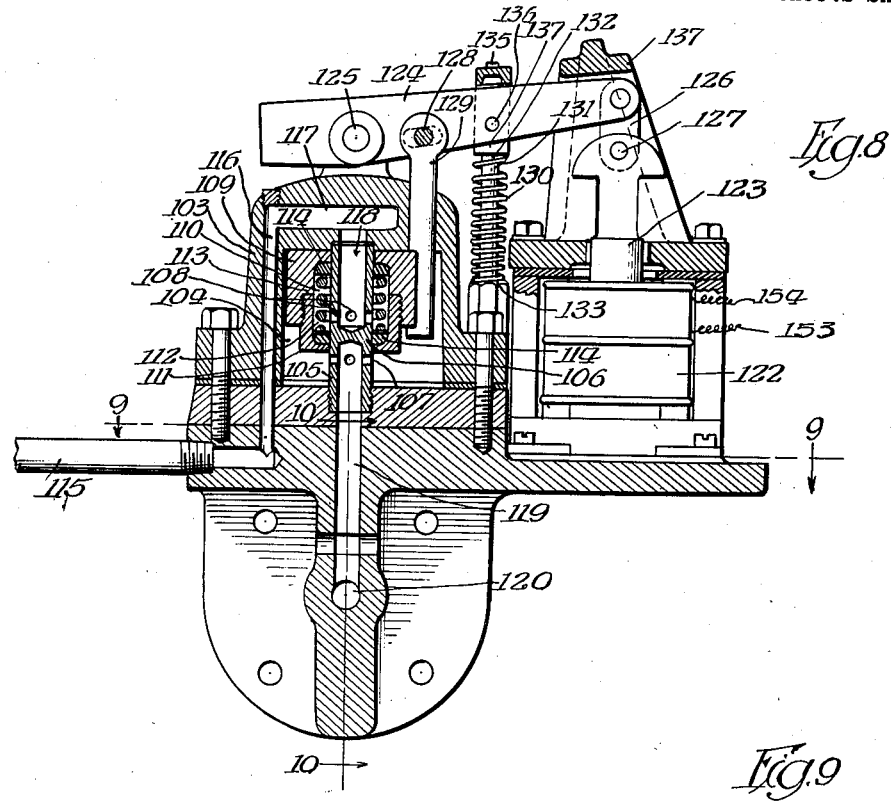

Figure 8 is an enlarged sectional view of one of the control valves and the solenoid operating mechanism therefor, taken on line 8—8 Figure 6, on an enlarged scale.

Figure 9:
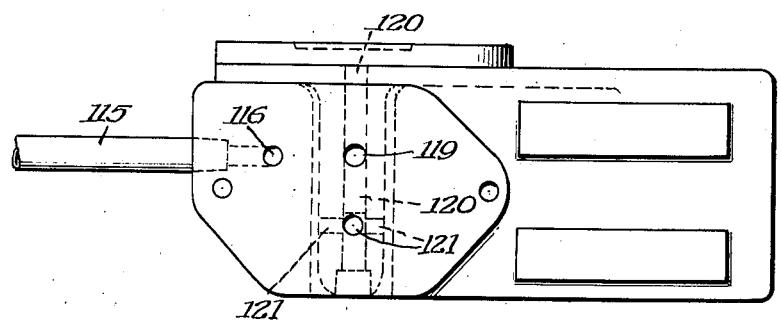

Figure 9 is a plan view taken on line 9—9 Figure 8.

Figure 10:
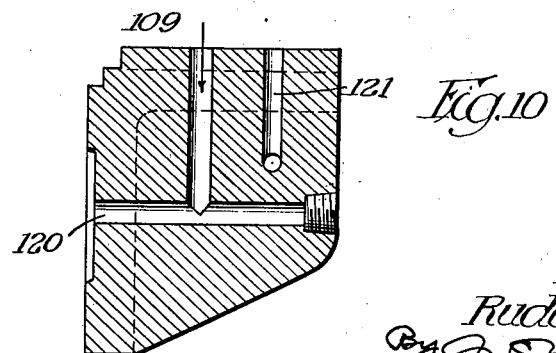

Figure 10 is a sectional view taken on line 10—10 Figure 8.

The press embodying the present exemplification of this invention consists essentially of a bed 15, uprights 16 and a crown 17, all of a well known construction, the parts being tied together by means of the usual tie rods 18 associated with which are the usual nuts 19.

This frame construction may be of any desired or suitable formation and the tie rods 18 are preferably arranged within the uprights 16 which latter are preferably hollow.

Secured to the uprights are gibs 20 fastened in any desired or suitable manner such as by means of bolts and nuts 20—21 and provided on the gibs are teeth 23 which constitute a rack. These racks 23 may be of any desired length and if desired four of these racks are provided at the four corners of the press.

Any desired number of locking mechanisms may be provided, but preferably one for each of the racks 23 and as the construction and operation of each of these mechanisms is the same, the description of one will apply equally as well to them all, it being understood that one of the locking pawls 24 is provided adjacent each of the racks.

The locking mechanisms consist essentially of a pawl 24 pivotally mounted intermediate its ends as at 25 upon the slide 26, which slide is adapted to be reciprocated in any desired or suitable manner.

In the present form of the invention eccentrics 27 are provided for that purpose and with these eccentrics eccentric straps 28 co-operate. The ends 29 of the straps are pivotally connected as at 30 through suitable connecting means with the slide 26, a connecting bar 31 being provided, if desired, to extend between adjacent pivots 30.

Connected with each of the eccentrics 27 is a gear 32 and with these gears 32 gears 33 respectively mesh, and these gears 33 mesh with each other. Connected with one of these gears 33 to rotate therewith is a gear 34 with which a gear 35 meshes, the gear 35 being mounted upon the main drive shaft 36 of the machine.

Thus when the shaft 36 rotates the slide 26 will be reciprocated through the medium of the intermediate connecting gears, eccentrics and straps.

The locking pawl 24 is provided with one or more teeth 37 (see particularly Figure 5) and also with a shoulder 38 that in turn co-operates with a shoulder 39 provided on the slide 26.

Pivotally connected to the pawl 24, as at 40, is a bar or rod 41 which passes through a guide or bracket 42 also mounted upon a portion of the slide 26. A coil spring 43 encompasses the rod 41, one end of the spring engaging a shoulder or collar 44 which co-operates with the bracket 42 and through which the rod 41 slides. The other end of the spring 43 engages a shoulder 45 on the rod and tends normally to move the pawl 24 about its pivot in a direction that the tooth 37 of the pawl will engage one of the teeth 23 of the rack to lock the slide 26 against downward movement.

Mounted upon the slide is a cylinder 47 in which there is provided a piston 48 having suitable packing 49. A piston rod 50 which is connected with the piston 48 extends through the end 51 of the cylinder 47. Leading through the wall of the cylinder 47, as at 52, is a port which is of a diameter considerably less than the diameter of the pipe 53 which communicates with the port. This port 52 preferably communicates with a recess or chamber 54 in the wall of the cylinder and has communication with the cylinder beneath the piston 48.

With the construction thus far described it will be manifest that the normal tendency of the spring 43 is to move the pawl into locking relation with respect to the teeth 23 and the movement of the pawl 24 under the stress of the spring 43 will cause the pawl 24 to act upon the end of the piston rod 50 to depress the piston 48 and force the fluid out of the cylinder 47 through the recess 54 and out of the opening 52. This will render the pawl 24 active.

To release the pawl so that the slide 26 may be lowered fluid under pressure will be delivered into the cylinder beneath the piston through the pipe 53 to swing the pawl 24 about the pivot 25 against the stress of the spring 43. By reason of the restricted passage 52 the fluid will be delayed in its discharge from the cylinder. This is advantageous because when the machine is running and after the operating power has been cut off from the machine some of the parts will still have momentum and will not stop immediately. Therefore by restricting or holding back the discharge of the fluid from the cylinder 47 from beneath the piston 48 the pawl 24 will be delayed in its engagement with the teeth 23 so that the parts which are operating under momentum will be permitted to stop.

When the pawl is being moved about its pivot 25 under the stress of the spring 43 and into active engagement with the teeth 23, such movement will be limited or controlled by engagement of the shoulder 38 of the pawl with the shoulder 39 of the slide 26.

The shaft 36 is mounted in suitable bearings 55—56 (see particularly Figure 6) and rotatably mounted thereupon is a pulley 57 (see particularly Figures 1 and 6) which is driven by a belt 58 that passes over a pulley 59 on the shaft of a motor 60, the latter being supported by a suitable bracket 61.

This pulley 57 is adapted to be locked to and released from the end portion 62 of the shaft 36 and in order to control the movement of the shaft 62 with respect to the rotation of the pulley 57 suitable brake and clutch mechanisms are provided.

This brake and clutch mechanism may be of any desired or suitable construction but a simple and efficient construction embodies a clutch mechanism comprising a member 63 which is secured to the shaft 62 for rotation therewith, in any suitable manner, and may be provided with radial ribs or fins 63 which co-operate with ribs or fins 65 on the adjacent face of the member 57 for creating a current of air to flow over the adjacent parts.

Co-operating with the clutch member 63 is a clutch member 66 which is mounted preferably on the hub 67 of the member 63 and is adapted for lateral movement towards and away from the clutch member 63. To that end the member 63 has a sliding connection with the hub 67.

Supported by the rotatable member 57 is an annular member 68 secured in position by suitable fastening means 69.

This member 68 is provided with teeth or projections 70 engaged by the teeth 71 on a lining carrying member 72 that is disposed between the clutch members 63 and 66.

This member 72 is adapted for lateral movement with respect to the member 68 towards and away from the rotatable member 57 to cause the proximate faces of the clutch members 63 and 66 to grip the lining carrying member 72 and thereby lock the rotatable member 57 with the shaft 62—36 to rotate the latter.

When the clutch members 66 and 63 are relatively moved one away from the other the gripping action upon the lining carrying member 72 will be released and the member 57 will be adapted to rotate independently with respect to the shaft.

A cylinder 73 is provided with a hub 74 that is keyed to the shaft 62 for rotation therewith and with the clutch member 63. Within the cylinder is a piston 75 provided with an annular projection portion 76 having a threaded periphery 77. Mounted in the projecting portion 76 is one or more spring pressed pins 78 that is arranged transverse to the axis of the shaft 62. This pin is adapted to enter recess 79 in an annular member or ring 80 that is threaded upon the projecting portion 76. This member 80 is held in position by means of an annular member 81 in turn held in position by screws 82.

The piston 75 is provided with a hub 83 that slides upon the hub 74 and a packing 84 may be provided to form a fluid tight joint between these parts.

A brake element 85 is provided with a portion 86 to which an annular member 87 similar to the annular member 88 is adjustably secured. The portion 86 is provided with a number of recesses to selectively receive a spring pressed pin 89 and secured to the member 87 are any desired number of laterally projecting pins 90 which are also secured to the piston 75 in the cylinder 73.

Encompassing each of these pins is a coil spring 91 one end of each of which abuts the element 87 and the other end abuts or is seated in a recess in the cylinder 73, as at 92.

The brake member 85 co-operates with a brake member 93 which is mounted upon or forms a portion of a hub 94, the hub 94 being secured to the shaft 62 for rotation therewith. The brake element 85 is adapted for rotation with the brake element 93 and for lateral movement with respect thereto through the medium of an interengaging connection portion 95.

Carried by a portion of the frame 16 is an annular element 96 secured in position in any suitable manner such as by means of fastening bolts 97. This element 96 is provided with teeth 98 engaged by peripheral teeth 99 on a brake lining carrying element 100. This element 100 is preferably annular in configuration and encompasses the shaft 62 and is disposed between the brake members 85 and 93 so as to be gripped or released by the brake members when they are laterally shifted one with respect to the other.

The normal tendency of the springs 91 is to retract the piston 75 in the cylinder 73 so as to withdraw the clutch member 66 with respect to the clutch member 63 to release the brake lining carrying member 72 and thereby permit the element 57 to rotate freely upon the shaft.

At the same time the springs 91 act to render the brake mechanism effective, that is, to shift the brake member 85 toward the brake member 93 to grip the brake lining carrying member 100 which latter is held against rotation by being secured to the frame 16.

Any wear between the faces of the members of the clutch or brake is respectively compensated by releasing the respective elements 76 and 87 by depressing the locking pins 78—89 and rotating the respective elements 76—87 with respect to the element 86 until the pins 78—89 enter another one of the respective recesses 82—88.

The clutch and brake members are rendered effective against the stress of the springs 91 by fluid pressure supplied from a suitable source and discharged into the cylinder 73 behind the piston 75 through a passage 101 in the shaft 62 that communicates with a passage 102 in the hub 74 and thence through a suitable opening in the wall of the cylinder 73.

When the pressure of the fluid is released or reduced the springs 91 will retract the piston forcing the fluid from the cylinder back through the passages 102 and 101.

Therefore, in order to control the stopping and starting of the machine it is only necessary to control the supply of fluid pressure to the cylinder 73. This may be accomplished by means of an electrically controlled valve mechanism comprising a casing 103 (see particularly Figures 8, 9 and 10) in which there is provided a chamber 104. Within the chamber is a tubular member 105 preferably supported by the top and bottom wall of the chamber. This tubular member is open at both ends and is provided with a partition 106 extending thereacross intermediate and spaced from its ends.

Openings 107 are provided in the member 105 on one side of the partition 106 and similar apertures 108 are provided in the wall of the member 105 on the other side of the partition 106. A valve unit is arranged within the chamber and this unit comprises a member 109 having a chamber 110 therein and a second member 111 having a chamber 112 therein, the chambers opening through one face of the respective members. These two members 109—111 are separably secured together by screwing one of the members into the other so that the open ends of the respective chambers will be in register to form a chamber in which is arranged a coil spring 113. The members 109—111 encompass the member 105 and this member projects through the chambers to form a guide or support upon which the valve unit is adapted to be moved.

Packing elements 114 are provided to form fluid tight joints. The valve unit thus formed is of a height somewhat less than the height of the chamber 104, and the chambers 110 and 112 are of an internal diameter somewhat greater than the external diameter of the member 105 upon which the valve unit slides.

When the valve is in the position shown in Figure 8 the ports 108 in the member 105 will form communication between the interior portion of the member 105 on one side of the partition 106, with the chamber 110 so that fluid pressure entering the fluid pressure supply pipe 115 will flow through a passage 116 in the wall of the casing 103 to a chamber 117 to be discharged through an outlet opening 118 that is in register with the open end of the member 105 and delivered into the chamber 110—112, and will remain confined in the latter until the valve unit 109—111 is lowered so as to bring the chamber 110—112 into register with the ports 107, the chamber 112 being of sufficient size to also maintain the ports 108 in communication therewith when the valve is in the latter position. This will permit the fluid pressure which is in the chamber 112 to then flow through the ports or openings 107 on the other side of the partition 106 into a passage 119 into a passage 120 that has communication with the passage 101 in the shaft 62 and which passage 101 in turn communicates with the interior of the cylinder 73 through the passage 102. This will operate the piston 75 to apply the clutch that locks the rotatable member with the shaft 62, and at the same time release the brake embodying the brake elements 85—93.

When the valve 109—111 is moved back to the position shown in Figure 8, the supply of fluid pressure will be shut off. This will permit the springs 91 to retract the piston 75 to apply the brake and release the clutch. At the same time the fluid which has been previously forced into the cylinder 73 will be forced out of the cylinder by the movement of the piston and the fluid will then flow back through the passage 102, passage 101, into the passage 120 back through the passage 119 into the chamber 104 through the ports 107 in the member 105 and out of the chamber 104 through exhaust passage 121 that communicates with the atmosphere.

The valve member 109—111 is preferably operated by means of an electroresponsive device (see particularly Figure 8) comprising a solenoid 122 and an armature or core 123 supported in any suitable manner and constituting a portion of the valve mechanism.

The numeral 124 designates a lever which is pivotally supported as at 125, one end of the lever being connected by means of a link 126 to the armature or core 123, as at 127.

Pivotally supported by one end, as at 128, is a depending member 129, the same being provided with a seat or recess 130 into which a portion of the element 109 of the valve unit is seated or projects so that when the armature or core 123 of the electroresponsive device is reciprocated, the valve unit 109—111 will be correspondingly moved.

A spring 131 tends normally to move the valve and the armature or core 123 in the opposite direction. This may be of any suitable construction but preferably comprises one or more coil springs encompassing a rod 132, or if desired a plurality of these springs may be provided, one end of the springs contacting a stationary abutment 133 and the other end contacting a shoulder 134 connected with the lever 124. This shoulder 134 may be, if desired, a portion of a yoke 135 which is secured as at 136 to the lever.

The normal tendency of the spring or springs 131 is to raise the lever 124 about its pivot 125 to raise the valve unit 109—111 to the position shown in Figure 8 and to also raise the core or armature 123 of the solenoid 122. This will occur when the magnet or coil of the electroresponsive device is de-energized. A stop 137 may be provided for limiting the movement of the lever 124 under the stress of the spring or springs 131.

Thus, by controlling the operation of the electroresponsive device the position of the valve unit 109—111 will be controlled and the fluid pressure will be admitted into the cylinder 73 or allowed to be discharged therefrom, thereby controlling the clutch and brake mechanism.

The fluid pressure is supplied from any suitable source, through a supply pipe 138 (see particularly Figures 1, 2 and 6) to a tank 139 and from the tank to the valve mechanism just described by means of the pipe 115 leading from the tank.

The supply of fluid pressure, however, which is to be delivered into the tank 139 before it enters the tank passes through and is controlled by another valve mechanism designated generally by the reference numeral 140 which is of the same construction as the valve mechanism just previously described, and operates in a similar manner, the latter valve mechanism being controlled by an electroresponsive device 141 similar in construction and operation to the electroresponsive device 122.

The fluid which is supplied to the tank 139 is not only employed for the purpose of controlling the clutch and brake mechanism but also for controlling the operation of the locking pawls 24 for locking the slide 26 against movement when the clutch mechanism is rendered inactive and the brake rendered active and to that end a pipe 142 leads from the tank to the pipe 53 through the medium of a pipe 143 which latter is preferably flexible so as to permit the slide 26 to be raised and lowered without interfering with the connection with the tank 139, which latter is preferably mounted upon a stationary part of the machine.

This pipe 143 connects with a pipe 144 that has communication with the pipes 53 that preferably connect the cylinders 47 in pairs and the pipes 53 are themselves in turn connected by means of a connection pipe 145 (see particularly Figure 7) so that when fluid under pressure is delivered from the tank 139 through the pipe 142 such pressure will be equally distributed to the cylinders 47.

The electroresponsive devices are controlled by suitable control buttons conveniently located for the operator and current is supplied from any suitable source of power through the lines or conductors 146—147—148.

Carried by the slide 26 are switch devices 149 one for each of the cylinders 47. These switches may be of any desired or well known construction that operate to close the circuit of the solenoid 122 when the locking pawls 24 are shifted by the action of the pistons 48 in the cylinders 47 that are carried by the slide 26.

Each of these switches is provided with an operating arm or button 150 that is arranged in the path of movement of the respective rods 41 (see particularly Figures 2 and 5) so that when the pawl 24 is moved by the piston 48 to render the pawl inactive with respect to the teeth 23, the ends of the rods 41 will engage the respective buttons or control members 150 to actuate the switch and thereby close the line to the solenoid 122. The closing of these circuits renders it possible to energize the solenoid 122.

The press is then ready for operation by depressing or operating a button or switch device 151 in the line 152—153 that leads to the solenoid 122 and also to the switches 149.

When these switches 149 are closed the solenoid 122 may be energized and this will actuate the valve unit 109—111 to admit fluid pressure to the cylinder 73, releasing the brake and engaging the clutch. The press will then run continuously as long as the switch or control device 151 is closed.

Referring more particularly to the wiring diagram shown in Figure 7, the motor 60 is of the three phase type. To start the press in operation the switches 154—155—156 are closed which will start the motor and the fly wheel or rotating element 57, as the brake will be active and the clutch disengaged. Closing of the switches 154—155—156 will also cause current to flow from the conductor 147 through the switch 155 through the line 157 to and through the solenoid 141, thence through the line 158 back to the line 148, causing the solenoid 141 to be energized, opening the valve 140 thereby permitting fluid pressure to flow into the tank 139.

At the same time fluid pressure from the tank 139 will flow through the pipe 142—143, pipes 53 and into the cylinders 47 beneath the pistons 48. This fluid pressure will raise the pistons 48 thereby rocking the pawls 24 about their pivots 25 to move the teeth 37 of the pawls out of engagement with the teeth 23. This will unlock the slide 23, thereby rendering the locking mechanism inactive.

As the pawls 24 are thus actuated the rods 41 will engage the contacts 150 shifting the latter to actuate the switches 149 and thereby close the line or circuit which leads through the solenoid 122 so that when the switch or control device 151 is actuated the current will flow through the solenoid 122 to actuate the valve element 109—111 so that the fluid pressure from the tank 139 will be admitted into the cylinder 73 through the pipe 139ª past the valve 109—111 and through the pipe 120 to release the brake and apply the clutch so that the slide will operate.

This is accomplished in the following manner. When the switch or control device 151 is closed the current will flow through the switch device 151, conductor 152, switch devices 149, conductor 153 through the solenoid 122 and to conductor 154 to energize the solenoid 122.

The pawls being then released, the slide will be reciprocated by the drive mechanism.

When the switch 151 is released or opened, the solenoid 122 will be de-energized and the springs 131 will move the valve 109—111 from the position shown in Figure 8 so that the fluid pressure supplied through the pipe 115 and to the cylinder 73 will be permitted to exhaust from the cylinder so that the springs 91 will apply the brake and release the clutch to stop the operation of the slide.

Upon the de-energization of the solenoid 141 and the exhaust or cutting off of the supply of fluid to the tank 139, the source of supply will also be cut off from the cylinders 47 as well as the cylinder 73, thereby allowing the springs 43 to shift the pawls 24 into active locking position to lock the slide 26 against movement.

By this movement of the pawls 24 the end of the rod 41 moves out of engagement with the control 150 of the switches 149 breaking the circuit through the solenoid 122.

The supply of fluid pressure from the main source of supply through the pipe 138 to the tank 139 is controlled by the valve 140 which in turn is controlled by the solenoid 141. This solenoid is controlled by the switches 155—156 so that when the circuit is closed to start the motor 60, the solenoid 141 will be energized to open the valve 140 but, when the current to the motor is shut off, then the solenoid 141 will be de-energized and the valve 140 will be closed to shut off the supply of fluid pressure to the tank 139 and at the same time exhaust the fluid pressure in the tank 139 as well as in the cylinders 47.

Thus it will be seen that the supply of fluid pressure through the pipe 138 to the tank 139, as well as to the cylinders 47, will be controlled in part by the same mechanism which controls the starting and stopping of the motor, and the energization and de-energization of the solenoid 122, which latter controls the supply of fluid pressure to the clutch cylinder 73, will be respectively controlled by the switches 149 and 151.

That is to say, when the switches 149 are set by the release of the pawls 24 the supply of fluid to the cylinder 73 will be controlled by the valve 109—111 and this solenoid 122 in turn is controlled by the switch 151 adapted to be actuated at the will of the operator.

If desired, and in order to stop the operation of the press at any time an additional switch 159 in the line 152—154 may be provided in a convenient position for the operator.

In order to inch or impart an advancing movement to the slide when desired and when the motor is not in operation, inching mechanism is provided and in order to accomplish this the solenoid 122 must be energized to admit fluid pressure to the tank 139 and cylinder 47, to release the locking pawls 24. This mechanism consists of a control box designated generally by the reference numeral 160 embodying separate buttons or switch devices 161—162. The button 161 is operated to complete a circuit from the line 147, conductor 163, contact 164, through contact 165, conductor 166, to conductor 157, through the solenoid 141, back through the conductor 158 to the line 148.

The button 162 controls contacts 167—168, the button 162 being included in a line 169 that leads to the line 152, while leading from the contact 168 is a line 170 that is connected with the line 152, the connections of the conductors 169—170 with the line 152 being on opposite sides of the switch 151.

This inching mechanism is employed only when the motor circuit is cut off and provides a means for controlling the movement of the slide 26.

To effect this operation the button or switch 161 is closed and held closed while the button or switch 162 is intermittently opened or closed or pulsated to cause the circuit through the solenoid 122 to be interrupted intermittently and to energize and de-energize it.

When the button 161 is actuated to close the circuit the solenoid 141 will be energized to open the valve 140 to permit fluid pressure to enter the tank 139, so that fluid pressure can be supplied to the cylinder 73 to control the clutch and brake. The air pressure will not only be supplied to the cylinder 73 but also to the cylinders 47 to release the slide locking mechanism by shifting the pawls 24. The shifting the pawls 24 will actuate the switches 149 to close them so that the solenoid 122 may be energized. The button 162 is then intermittently operated so that the solenoid 122 will be intermittently energized and de-energized to control the clutch in the manner already stated.

When the button 161 is depressed and the button 162 pulsated or intermittently operated the current for the inching operation will flow from the line 152, through the conductor 169, to the contact 167, through the switch device to the contact 168, thence through the conductor 170 to the conductor 152, through the switch devices 149, thence to the conductor 153, through the solenoid 122, and then through the conductor 154.

Obviously all of the conductors may be encased in suitable housings such as pipes or conduits 171 which may be employed wherever desired or necessary.

It will also be manifest that the control buttons or switches which are manually operated may be located in any convenient position for the operator and may be supported by the frame of the machine.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. In a press, a slide, power means for operatively cyclically moving the slide, means embodying a clutch for connecting the slide with the power means, fluid pressure means for controlling the clutch, means for controlling said fluid pressure means, locking means for the slide to maintain it against movement when it is inactive with respect to the power means, means whereby the said fluid pressure means will control the said locking means, and means responsive to the actuation of said locking means for conditioning the fluid pressure controlling means to be subsequently operated, the last recited means embodying an electroresponsive device, an open circuit in which said device is included, and a switch for partially closing the circuit.

2. In a press, a driven element for cyclically operating the slide, a slide, fluid pressure actuated means for rendering the slide active and inactive with respect to said driven element, locking means for maintaining the slide against movement when it is rendered inactive with respect to the said driven element, said locking means being inactive during repeated cyclic operations of the slide, a source of supply of fluid pressure, means connecting the fluid pressure supply with the said fluid pressure actuated means, means for controlling such connection, fluid pressure actuated means for actuating said locking means, means for controlling the last said connection, and means individual to the controlling means and to said connections for controlling them, the controlling means for the first said fluid pressure actuated means being rendered active in response to the actuation of the said locking means.

3. In a press, a slide, driving means for cyclically operating the slide, means for rendering the slide active and inactive with respect to said driving means, the last said means embodying fluid actuated mechanism, a source of supply of fluid pressure, means embodying a valve for controlling the supply of fluid to said fluid actuated mechanism, locking means for maintaining said slide against operation when it is inactive with respect to said driving means, fluid pressure actuated means for controlling said locking means, the said locking means being maintained inactive during repeated cyclic operations of the slide, means adapted to be set by the releasing of said locking means for rendering the valve actuating means capable of subsequent operation to render the said locking means active, and means for thus subsequently operating the said valve.

4. In a press, a slide, driving means for cyclically operating the slide, means for rendering the slide active and inactive with respect to said driving means, the last said means embodying fluid actuated mechanism, a source of supply of fluid pressure, means embodying a valve for controlling the supply of fluid to said fluid actuated mechanism, locking means for maintaining said slide against operation when it is inactive with respect to said driving means, fluid pressure actuated means for controlling said locking means, the said locking means being maintained inactive during repeated cyclic operations of the slide, means adapted to be set by the releasing of said locking means for rendering the valve actuating means capable of subsequent operation, and means for thus subsequently operating the said valve whereby the locking means may be rendered active, the last said means embodying a normally inactive electric circuit, an electro-responsive device in said circuit, and means for subsequently rendering said circuit active.

5. In a press, a slide, driving means for cyclically operating the slide, means embodying fluid actuated mechanism for rendering the slide active and inactive with respect to the driving means, means for locking the slide against movement when it is inactive with respect to said driving means, fluid actuated mechanism for controlling the operation of the said locking means, said locking means being maintained inactive during repeated cyclic operations of the slide, a source of supply of fluid pressure, means for controlling the said source of supply, means adapted to be set by the releasing of the said locking means to be subsequently rendered active to control the operation of the first recited fluid actuated mechanism, and means for thus subsequently rendering active the said set means.

6. In a press, a slide, driving means for cyclically operating the slide, means embodying fluid actuated mechanism for rendering the slide active and inactive with respect to the driving means, means for locking the slide against movement when it is inactive with respect to said driving means, fluid actuated mechanism for controlling the operation of the said locking means, said locking means being maintained inactive during repeated cyclic operations of the slide, a source of supply of fluid pressure, means for controlling the said source of supply, electro-responsive means adapted to be set by the release of said locking means to be subsequently actuated to render active to control the operation of the first recited fluid actuated mechanism, a normally open circuit in which said electro-responsive means is included, and means for closing said circuit.

7. In a press, a slide, driving means for cyclically operating the slide, mechanism for rendering the slide active and inactive with respect to said driving means, means for locking the slide when it is inactive with respect to said driving means, a control for the driving means, means responsive in its operation to the actuation of said control means for controlling the said mechanism and for controlling said locking means, said locking means being maintained inactive during repeated cyclic operations of the slide, and means operable at will for controlling the said control means.

8. In a press, a slide, driving means for cyclically operating the slide, mechanism for rendering the slide active and inactive with respect to said driving means, means for locking the slide when it is inactive with respect to said driving means, a control for the driving means, means responsive in its operation to the actuation of said control means for controlling the said mechanism and for controlling said locking means, said locking means being maintained inactive during repeated cyclic operations of the slide, means operable at will for controlling the said control means, the means which controls the said mechanism and the said locking means embodying a fluid pressure control valve, an electro-responsive device for controlling the valves, and means operable at will for controlling said electro-responsive device.

9. In a press, a slide, driving means for cyclically operating the slide, mechanism for rendering the slide active and inactive with respect to said driving means, means for locking the slide when it is inactive with respect to said driving means, a control for the driving means, means responsive in its operation to the actuation of said control means for controlling the said mechanism and for controlling said locking means, the said locking means being maintained inactive during repeated cyclic operations of the slide, means operable at will for controlling the said control means, the means which controls the said mechanism and the said locking means embodying fluid pressure control valves, electro-responsive devices individual to the valves, and means responsive to the operation of the locking means for rendering one of said electro-responsive devices susceptible to subsequent operation.

10. In a press, a slide, driving means for cyclically operating the slide, mechanism for rendering the slide active and inactive with respect to said driving means, means for locking the slide when it is inactive with respect to said driving means, a control for the driving means, means responsive in its operation to the actuation of said control means for controlling the said mechanism and for controlling said locking means, said locking means being maintained inactive during repeated cyclic operations of the slide, means operable at will for controlling the said control means, and additional means operable at will for controlling the said mechanism and the said locking means for lowering the slide.

11. In a press, a slide, driving means for cyclically operating the slide, mechanism for rendering the slide active and inactive with respect to the driving means, means for locking the slide when it is inactive with respect to the said driving means, a source of supply of fluid pressure for controlling the said mechanism and the said locking means, said locking means being maintained inactive during repeated cyclic operation of the slide, valve means for controlling said supply, a second valve means individual to the said mechanism for controlling it, electro-responsive devices individual to the said valve means for controlling them, means for controlling one of said electro-responsive devices, means adapted to be set by the actuation of said locking means to render the other of said electro-responsive devices susceptible to subsequent operation, and means for thus subsequently operating the said other electro-responsive device.

12. In a press, a slide, a source of power for operatively cyclically moving it, fluid pressure controlled means for connecting the slide to said source of power and for disconnecting it therefrom, locking means for maintaining the slide against movement when it is disconnected from said source of power, means operating normally to maintain the said locking means inactive while the slide is operatively connected with the said source of power, and means adapted to be set when the said locking means is rendered inactive, whereby upon failure of the source of power the said locking means may be rendered active.

13. In a press, a slide, a source of power for operatively cyclically moving it, fluid pressure controlled means for connecting the slide to said source of power and for disconnecting it therefrom, locking means for maintaining the slide against movement when it is disconnected from said source of power, means operating normally to maintain the said locking means inactive while the slide is operatively connected with the said source of power, control means adapted, upon rendering said locking means inactive, to be set for subsequent operation for rendering the said connecting means inactive and the said locking means active, and means for controlling the said control means.

14. In a press, a slide, a source of power for cyclically moving it, means for connecting the slide to the source of power and for disconnecting it therefrom, a lock for the slide when the latter is disconnected from the source of power, means responsive to the rendition of said connecting means inactive for causing the said lock to be automatically rendered active, electro-responsive means for controlling the said connecting means, and means whereby when the said locking means is rendered inactive a switch in the circuit of said electro-responsive means will be closed so that the said connecting means will be in a condition to be rendered active only when the said locking means is inactive.

RUDOLPH W. GLASNER.